(12) United States Patent
Parker et al.

(10) Patent No.: US 9,083,915 B2
(45) Date of Patent: Jul. 14, 2015

(54) 3D ELECTRONIC PROGRAM GUIDE

(75) Inventors: Alistair John Parker, Edmonton (CA); Jared David McNeill, Kanata (CA)

(73) Assignee: Alcatel Lucent, Boulogne-Billancourt (FR)

(*) Notice: Subject to any disclaimer, the term of this patent is extended or adjusted under 35 U.S.C. 154(b) by 699 days.

(21) Appl. No.: 11/905,247

(22) Filed: Sep. 28, 2007

(65) Prior Publication Data

US 2009/0089834 A1 Apr. 2, 2009

(51) Int. Cl.
*H04N 21/482* (2011.01)
*H04N 5/445* (2011.01)
*H04N 21/431* (2011.01)
*H04N 21/443* (2011.01)

(52) U.S. Cl.
CPC ......... *H04N 5/44543* (2013.01); *H04N 21/431* (2013.01); *H04N 21/4314* (2013.01); *H04N 21/4438* (2013.01); *H04N 21/482* (2013.01); *H04N 21/4821* (2013.01)

(58) Field of Classification Search
IPC ........................... H04N 21/4821,21/482, 21/431
See application file for complete search history.

(56) References Cited

U.S. PATENT DOCUMENTS

| | | | |
|---|---|---|---|
| 5,850,218 A * | 12/1998 | LaJoie et al. | 725/45 |
| 6,034,677 A * | 3/2000 | Noguchi et al. | 715/719 |
| 6,421,067 B1 | 7/2002 | Kamen et al. | |
| 6,577,350 B1 * | 6/2003 | Proehl et al. | 348/564 |
| 6,795,972 B2 | 9/2004 | Rovira | |
| 6,857,128 B1 * | 2/2005 | Borden et al. | 725/39 |
| 7,373,650 B1 * | 5/2008 | Rodriguez et al. | 725/41 |
| 2001/0023401 A1 * | 9/2001 | Weishut et al. | 705/1 |
| 2002/0124254 A1 * | 9/2002 | Kikinis | 725/34 |
| 2003/0005439 A1 * | 1/2003 | Rovira | 725/37 |
| 2003/0084445 A1 * | 5/2003 | Pilat | 725/44 |
| 2004/0008198 A1 | 1/2004 | Gildred | |
| 2004/0103432 A1 | 5/2004 | Barrett | |
| 2004/0172649 A1 | 9/2004 | Van Beek | |
| 2004/0221307 A1 * | 11/2004 | Arai et al. | 725/44 |
| 2005/0005290 A1 | 1/2005 | Kamen | |
| 2007/0107015 A1 * | 5/2007 | Kazama et al. | 725/58 |

* cited by examiner

Primary Examiner — Robert Hance
(74) Attorney, Agent, or Firm — Marks & Clerk

(57) ABSTRACT

A method and apparatus are provided for displaying an electronic program guide in a 3D rendered landscape. Program blocks, each having a channel and a program time, are displayed as vertical blocks within the 3D rendered landscape. Channel information blocks are also displayed, one for each distinct channel of the program blocks. The EPG may be perused by navigating within the 3D rendered landscape. Flags are provided for highlighting program blocks which satisfy a user-specified criterion, such as favorite show. Perspective within the 3D rendered landscape allows many program blocks to be displayed, with program blocks for farther channels being compressed. The flags allow a user to see that there is a program of interest in the distance, and to navigate towards the associated program block in order to obtain further details.

17 Claims, 2 Drawing Sheets

3D ELECTRONIC PROGRAM GUIDE

FIELD OF THE INVENTION

The invention relates to display of scheduled information, and more particularly to display of electronic program guides.

BACKGROUND OF THE INVENTION

Electronic display devices, such as personal computers or television client devices such as set-top boxes, allow programming information to be displayed and scrolled interactively by a user. A user can peruse the programming information by scrolling backward or forward in scheduled time, or by scrolling through the available channels. Such electronic program guides (EPGs) present information about a scheduled program in a cell, the information usually including the title of the program being shown at the time and channel defined by the cell, but sometimes also including information such as type of show, maturity rating, or a brief synopsis of the program.

With the use of more advanced video graphics display abilities, there is an opportunity to use more than just the two dimensions of time and channel when displaying an electronic program guide. The use of a third dimension allows presentation of additional information, and allows greater flexibility in how information is displayed and in how a user navigates through the information.

SUMMARY OF THE INVENTION

In accordance with one aspect of the invention, a method is provided for displaying an electronic program guide (EPG). Program blocks are displayed in a three dimensional (3D) rendered landscape, each program block having a channel and a program time. The channel and program time are represented by the location of the program block within two horizontal dimensions of the 3D rendered landscape. A flag is displayed above at least one program block which satisfies at least one user-specified criterion, each flag being displayed above the respective program block in the vertical dimension of the 3D rendered landscape. Navigation means are provided for navigating the 3D rendered landscape in three dimensions so as to allow perusal of the EPG.

Apparatus are provided for carrying out the methods of the invention. The methods of the invention may be stored as processing instructions on non-transitory computer-readable storage media. If stored as processing instructions on non-transitory computer-readable storage media, navigation means are provided as instructions for instructions for adjusting the display of the 3D rendered landscape in response to navigation of the 3D rendered landscape in three dimensions by a user so as to allow perusal of the EPG.

The methods and apparatus of the present invention allow users to scroll through electronic program guides in a way which is more entertaining, and which takes advantage of the third display dimension to provide additional information to the user. Information can be compressed in a more natural way, and navigation through the information is more natural. For example, information that is closer appears larger and more detailed. Information that is further away, in the three dimensional perspective, can be compressed by removing detail and drawing primitives. This allows the user to be aware that there is information present, but it doesn't become readily discernible until called for by virtually approaching it. The use of flags in the third dimension to alert a user to information of interest allows the user to virtually approach compressed information.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Electronic program guide (EPG) information, generally comprising a two dimensional grid of channels and times, is acquired using standard mechanisms. This 2D EPG information is used to generate two dimensions of a 3D landscape. An industry standard 3D graphics card application program interface is used to build the 3D landscape containing EPG information. The 3D landscape may be displayed on any device which supports 3D rendering commands, either in graphics hardware or with a software-only renderer. As examples, the 3D landscape may be displayed on a personal computer, or on television screen through a set top box.

Two dimensions of the 3D landscape are the same as for traditional 2D grids, namely channel information and program times. These two dimensions are displayed as the horizontal dimensions of the 3D landscape. The program information pertaining to a channel and to a program time are displayed as program blocks extending vertically into the third dimension of the 3D landscape. Channel information blocks may also be displayed in the 3D landscape as vertical blocks, one channel block per channel. Preferably, channel information for different channels is arranged in the dimension extending away from the viewer, from the point of view of the user, and different program times are arranged in the dimension across the field of view.

Different static images may be laid out on surfaces within the 3D rendered landscape. These static images are used to create different visual settings in which the EPG information is displayed. For example, the static images may be used to create a street scene, a shopping mall, a forest, or a river. Such different settings may be chosen by the user, and result in a more pleasurable EPG perusing experience.

Figure 1:
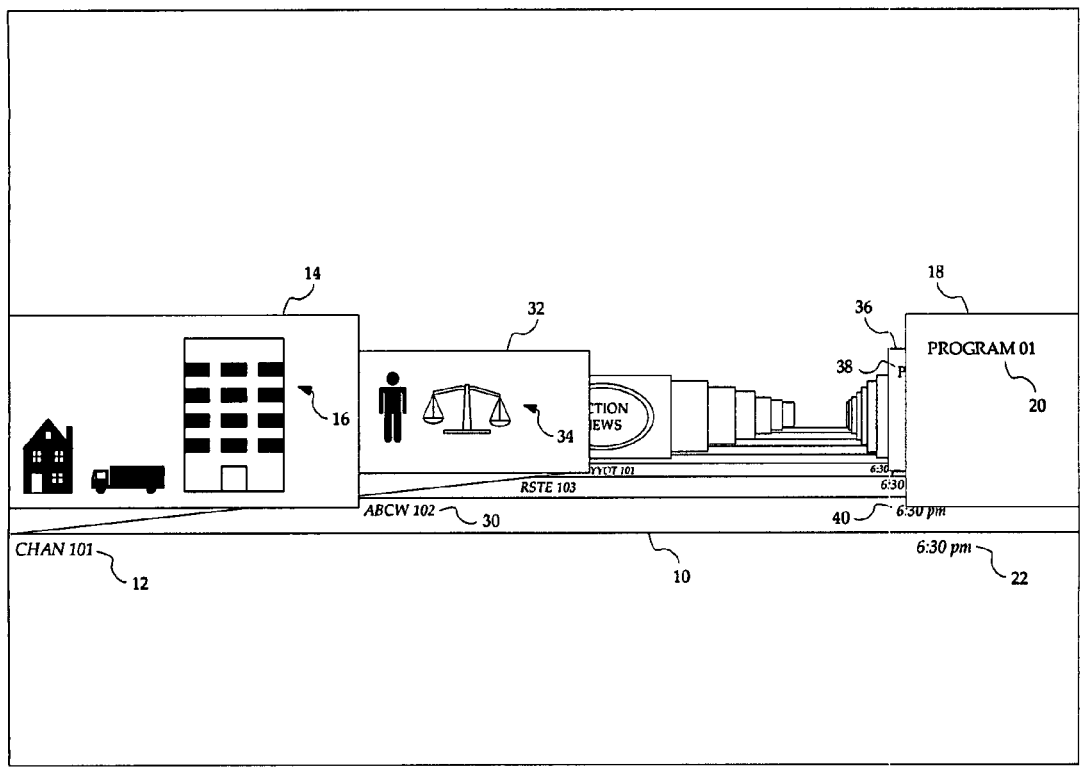
FIG. 1 is a diagram of an example view of the three dimensional electronic program guide according to one embodiment of the invention.

Referring to FIG. 1, an example display of EPG information according to one embodiment of the invention is shown. Each channel has a position along the channel information dimension in the 3D landscape. All information for the channel is displayed along this position, arranged generally across the field of view. A channel's position may be represented explicitly by a line, for example line 10, for easier correlation of channel information by the user. The channel information for a first channel includes a first channel identifier 12, a first channel information block 14, a first visual channel representation 16, a first program block 18, and a first program identifier 20. Associated with the first program block 18 is a first program time 22.

The first channel information block 14 is displayed as a vertical block above the first channel identifier 12. The first visual channel representation 16 may be a graphic or text representation of the channel, such as a station logo, or a graphic or text representation of the program currently playing on the channel. The first visual channel representation 16 may alternatively be a picture-in-picture display of the actual program currently playing on the channel.

The first program block 18 is displayed as a vertical block parallel with the first channel information block 14. The first program time 22 is displayed below the first program block. The first program identifier 20 is a text representation of the program that is scheduled to begin on the first channel at the first program time 22, or to continue playing on the first channel at the first program time 22 if the program has already started by the first program time. The first program identifier 20 is at least the title of the associated program, but may also include additional information about the program. The program identifier 20 may also include a graphic representation of the program, but the greater visual appeal of including a graphic representation of the program must be balanced against the greater visual clutter this may cause.

Each channel has similar information displayed at respective locations in the channel information dimension. The information is presented in a 3D perspective, in that channel information for channels further away from the first channel as measured by some metric (for example, higher channel number) is displayed in compressed format. Channel information for channels further away from the first channel may also be partially occluded by channel information for other channels. In FIG. 1, the channel information for a second channel includes a second channel identifier 30, a second channel information block 32, a second visual channel representation 34, a second program block 36, and a second program identifier 38. Associated with the second program block 36 is a second program time 40. As can be seen from FIG. 1, these information elements are displayed slightly smaller than and partially occluded by the information elements for the first channel. Channel information for additional channels is also displayed, the information for each channel being drawn progressively further away from the point of view within the 3D landscape.

It should be noted that the second program time 40 is the same as the first program time 22. This is because the program blocks are arranged across the field of view according to program time. Therefore all program blocks having the same location in the program time dimension, i.e. lined up when looking ahead from the user's point of view, will be for the same program time.

Perusal of the EPG is accomplished by navigation within the 3D landscape. A user can navigate the 3D landscape in which the EPG information is displayed by advancing or retreating along the channel information dimension, by scrolling from side to side along the program time dimension, or by raising or lowering the point of view along the vertical dimension. By descending, the channel identifiers may be seen clearly below the channel information blocks. By moving to the right (in FIG. 1), channel information blocks and visual channel representations may be more clearly seen. By moving to the left (in FIG. 1), program blocks and program identifiers may be seen more clearly. By moving upwards, both channel information blocks and program blocks may be seen more clearly, although program times and channel identifiers may become occluded or more difficult to see. By moving forward or backward, the channels for which information is more clearly displayed (i.e. near the front of the display of the 3D landscape) may be changed. Movement within the 3D landscape may also be done by selecting a program block or channel information block, and then zooming the view to the selected block.

Figure 2:
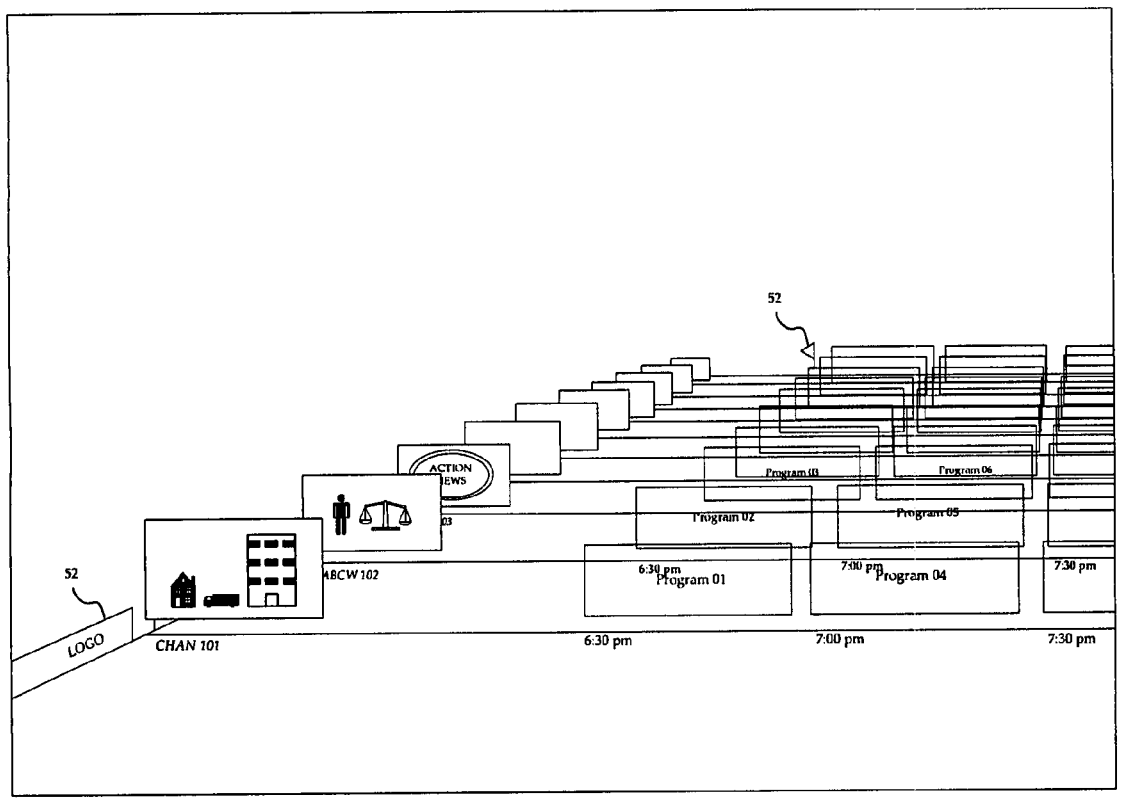
FIG. 2 is a diagram of the example view of FIG. 1 when seen from a different perspective.

Referring to FIG. 2, a different perspective of the display of EPG information of FIG. 1 is shown. The different perspective of FIG. 2 is reached by moving upwards and to the right from the perspective of the display of FIG. 1. Program blocks for additional program times are now visible, for example. The program blocks in FIG. 2 have been drawn as being transparent, whereas in FIG. 1 they are drawn as being opaque. In one embodiment of the invention, the program blocks are transparent or translucent in order to facilitate reading of program identifiers for program blocks that lie partially behind other program blocks.

It should be noted that in both FIG. 1 and FIG. 2, channel identifiers, visual channel representations, program identifiers, and program times for only the closest channels have been drawn, in order to avoid clutter of the drawings. Such information for other channels would also be displayed, but at greater compression for greater distance from the point of view.

The first program time 22 is changeable by the user. A default program time may be used as the first program time 22, such as the half-hour time that has most recently passed. The 3D landscape will typically display more than one program time, as shown in the example display of FIG. 2 in which program blocks for three different program times are shown. While the user may peruse successively later program times by navigating to the right within the 3D landscape, the user may wish to retain the channel information blocks within the display. It would be impractical to see program blocks for program times that are a few hours ahead while still retaining the channel information blocks, at least with any reasonable resolution display. As such, the user may also shift the displayed program times by shifting the first program time 22 to later times, i.e. display three or four sets of program blocks for program times in the future.

Programs which last more than the granularity of program start times (thirty minutes, in the example of FIG. 2) may be merged into a single program block spanning numerous program times. Programs which last less than the granularity of program start times may be represented by smaller program blocks.

Flags 50 may also be displayed in association with certain program blocks. The flags are used to indicate program blocks that satisfy user-specified criteria. Examples of such program blocks are those falling into program categories specified by the user (e.g. hockey games), those for specific programs specified by the user (e.g. all showings of "The Simpsons") and those for programs recently or most often watched. The flags 50 may be colour-coded to reflect different categories or programs as specified by the user. The flags 50 may be any graphical representation (e.g. triangular flag, floating circle), and are preferably located above the associated program block. In this way, a user may raise the point of view within the 3D landscape so that many program blocks may be seen, and notice that there is a program of interest in the distance. The user may then advance towards a flagged program block in order to see details of the program.

In order to navigate within the 3D world, an interface is provided which allows the user to move up or down, from side to side, or back and forth within the 3D world. The display of the 3D rendered landscape is adjusted in response to navigation of the 3D rendered landscape in three dimensions by the user so as to allow perusal of the EPG. Such movement allows different program blocks and different levels of detail of program blocks to be seen, as described above. The interface also allows programs or program types to be selected or unselected for flagging. The interface allows the removal or addition of channels to or from normal display, to or from a favourites list, and toggling between a favourites list and normal display. The interface allows selecting of a program block or channel information block, and then switching the television display to the channel of the program block or channel information block.

In one embodiment, when a program block or channel block is selected, 3D animation is used to transform the 3D landscape into a banner displayed at the top or bottom edge of the television display of the channel selected. For example, the 3D landscape may be rotated about an axis across the field of view and repositioned to reveal a banner of program information at the bottom of the screen, overlaying the regular display of the selected program.

As described above, the walls of the 3D landscape may be used to display static images for creating different settings in which the EPG is displayed. Additionally, or alternatively, a portion of the walls may be used to display advertising information 52, or additional visual channel information. For example, the visual channel representation may display a visual representation of the current program while the adjacent wall portion displays a visual representation of the channel. As another example, the visual channel representation may display a picture-in-picture display of what is currently playing on the channel while the adjacent wall portion displays a static visual representation of the program.

It should be noted that if the visual channel representation displays a picture-in-picture display of what is currently playing, the number of such displays may be limited by the number of tuners available for filtering the television signal. In such a case, only the nearest channel information block or channel information blocks will display picture-in-picture information of currently playing programs, while farther channel information blocks display static images of programs.

The invention is preferably implemented as instructions in software which has access to the 2D EPG information grid and to the 3D graphics display card. The software may be loaded into a processor on a personal computer or on a set top box. The software may also be stored on a non-transitory computer-readable storage medium. Alternatively, the invention may be implemented as hardware, such as on a graphics card of a personal computer, on a TV cable card of a personal computer, or within a set top box.

The interface may be in the form of a remote control, or in the form of an application with which a mouse or keyboard can interact if the 3D world is displayed on a personal computer.

Other arrangements for displaying program blocks and channel information blocks may be used. For example, the program blocks need not be presented in a rectangular grid of channel information and program time. The channel and program time of a program block may be more generally represented by location of the program block within the two horizontal dimensions of the 3D rendered landscape, and not specifically within a rectangular grid of channel information and program time. As another example, the channel information blocks may be absent, and the channel information of a program block presented in some other manner such as simple text information on the program blocks themselves.

The invention has been described as displaying an EPG in a 3D rendered landscape in which the 3D rendering takes into account perspective when calculating the display position of objects. The EPG may also be presented in a 3D rendered landscape which does not take perspective into account. In such an embodiment parallax can still be used to occlude a major portion of each program block, while still allowing flags 50 to be seen above the program blocks. However, there will be no compression of distant program information, which may in turn render navigation within the 3D landscape and perusal of the EPG a bit less intuitive.

The embodiments presented are exemplary only and persons skilled in the art would appreciate that variations to the embodiments described above may be made without departing from the spirit of the invention.

We claim:

1. A method of displaying an electronic program guide (EPG), comprising:
    displaying a plurality of program blocks in a three dimensional (3D) rendered landscape, each program block having a channel and a program time, the channel being represented by the location of the program block in a first horizontal dimension of the 3D landscape and the program time being represented by location of the program block within a second horizontal dimension of the 3D rendered landscape, each program block displaying a program identifier, each program block displayed as a two dimensional vertical rectangle perpendicular to the two horizontal dimensions and having a bottom edge lying in the same plane as the bottom edge of every other program block;
    displaying a flag above each of at least one of the program blocks satisfying at least one user-specified criterion, each flag being displayed above the respective program block in the vertical dimension of the 3D rendered landscape; and
    providing navigation means for navigating the 3D rendered landscape in three dimensions so as to allow perusal of the EPG.

2. The method of claim 1 wherein each flag has a colour identifying which of the at least one user-specified criterion is satisfied by the respective program block.

3. The method of claim 1 wherein displaying a plurality of program blocks comprises displaying the plurality of program blocks arranged in a rectangular grid lying in the two horizontal dimensions of the 3D rendered landscape, the channel being represented by location along one axis of the grid and the program time being represented by location along the other axis of the grid.

4. The method of claim 3 wherein all objects are displayed in the 3D rendered landscape using perspective.

5. The method of claim 4 wherein each flag has a colour identifying which of the at least one user-specified criterion is satisfied by the respective program block.

6. The method of claim 4 further comprising displaying a channel information block for each distinct channel of the displayed program blocks.

7. The method of claim 6 further comprising displaying on each channel information block a visual representation of the channel with which the channel information block is associated.

8. The method of claim 6 further comprising displaying on each channel information block a picture-in-picture display of a current program currently playing on the associated channel.

9. The method of claim 8 further comprising displaying on a side wall portion adjacent to each channel information block a visual representation of the channel with which the channel information block is associated.

10. The method of claim 6 further comprising displaying on a side wall portion adjacent to at least one channel information block an advertisement.

11. The method of claim 6 further comprising displaying images on surfaces within the 3D rendered landscape in order to create a visual setting for the EPG.

12. The method of claim 11 wherein the visual setting is a street scene, a shopping mall, a forest, or a river.

13. The method of claim 4 further comprising switching a television display to the channel of a selected program block upon selection of one of the program blocks.

14. The method of claim 13 wherein switching a television display to the channel of a selected program block further comprises rotating the 3D rendered landscape to reveal a banner of program information and displaying the banner across the top edge or bottom edge of the television display.

15. The method of claim 4 wherein the navigation means comprise means for zooming towards a selected program block.

16. The method of claim 4 further comprising:
displaying a channel information block for each distinct channel of the displayed program blocks;
displaying on each channel information block a visual representation of the channel with which the channel information block is associated;
displaying on a side wall portion adjacent to at least one channel information block an advertisement;
displaying images on surfaces within the 3D rendered landscape in order to create a visual setting for the EPG; and
switching a television display to the channel of a selected program block upon selection of one of the program blocks;

and wherein each flag has a colour identifying which of the at least one user-specified criterion is satisfied by the respective program block.

17. A non-transitory computer-readable storage medium storing instructions for processing by a processor, the instructions comprising:
instructions for displaying a plurality of program blocks in a three dimensional (3D) rendered landscape, each program block having a channel and a program time, the channel being represented by the location of the program block in a first horizontal dimension of the 3D landscape and the program time being represented by location of the program block within a second horizontal dimension of the 3D rendered landscape, and each program block displaying a program identifier, each program block displayed as a two dimensional vertical rectangle perpendicular to the two horizontal dimensions and having a bottom edge lying in the same plane as the bottom edge of every other program block;
instructions for displaying a flag above each of at least one program block satisfying at least one user-specified criterion, each flag being displayed above the respective program Hocks in the vertical dimension of the 3D rendered landscape; and
instructions for adjusting the display of the 3D rendered landscape in response to navigation of the 3D rendered landscape in three dimensions by a user so as to allow perusal of the EPG.

\* \* \* \* \*